US012594846B2

(12) United States Patent
Dickerson

(10) Patent No.: US 12,594,846 B2
(45) Date of Patent: Apr. 7, 2026

(54) CHARGING DEVICE

(71) Applicant: International Truck Intellectual Property Company, LLC, Lisle, IL (US)

(72) Inventor: Steven Joseph Dickerson, Lake in the Hills, IL (US)

(73) Assignee: International Truck Intellectual Property Company, LLC, Lisle, IL (US)

( * ) Notice: Subject to any disclaimer, the term of this patent is extended or adjusted under 35 U.S.C. 154(b) by 847 days.

(21) Appl. No.: 17/856,509

(22) Filed: Jul. 1, 2022

(65) Prior Publication Data
US 2024/0001780 A1    Jan. 4, 2024

(51) Int. Cl.
*B60L 53/16* (2019.01)
*B60L 53/62* (2019.01)
*H02J 7/00* (2006.01)

(52) U.S. Cl.
CPC .............. *B60L 53/16* (2019.02); *B60L 53/62* (2019.02); *H02J 7/00047* (2020.01)

(58) Field of Classification Search
CPC ........ B60L 53/16; B60L 53/62; H02J 7/00047
USPC ....................................................... 320/109
See application file for complete search history.

(56) References Cited

U.S. PATENT DOCUMENTS

| 4,990,885 | A | 2/1991 | Irick et al. |
| 6,836,094 | B1 | 12/2004 | Bender |

| 7,612,524 | B2 | 11/2009 | Howell et al. | |
| 7,821,227 | B2 | 10/2010 | Howell et al. | |
| 11,336,101 | B2 | 5/2022 | Hao et al. | |
| 2008/0079389 | A1 | 4/2008 | Howell et al. | |
| 2021/0242691 | A1 | 8/2021 | Hao et al. | |
| 2023/0311681 | A1* | 10/2023 | Morita | .................... B60L 53/60 |
| | | | | 700/297 |

FOREIGN PATENT DOCUMENTS

CN        114559829 A  *  5/2022

OTHER PUBLICATIONS

Kierstein, Alex, "GM Patents Dual Charging Port Tech With Huge Possibilities for EV Trucks," https://www.motortrend.com/news/gm-ultium-ev-truck-dual-charging-port-patent/ published May 24, 2022, accessed May 25, 2022 (4 pages).

Nedelea, Andrei, "GM Patents Dual Charge Ports to Reduce Charging Time, Increase Flexibility," https://insideevs.com/news/587807/gm-dual-charging-port-patent/, published May 24, 2022, accessed May 25, 2022 (5 pages).

"The Future of High-Powered EV Charging," TE Connectivity White Paper, TE Connectivity Corporation, Published Mar. 3, 2022 (8 pages).

"Could an electric car have more than one charging port?" Quora, https://www.quora.com/Could-an-electric-car-have-more-than-one-charging-port, published Apr. 18, 2021, accessed Apr. 11, 2022 (5 pages).

* cited by examiner

*Primary Examiner* — Suresh Memula

(74) *Attorney, Agent, or Firm* — Umang Khanna

(57) ABSTRACT

A charging device comprises supply inlets having contact elements engageable with a power source. Charging control modules are included in the supply inlets. A uniform charging standard comprise each of the charging control modules.

20 Claims, 5 Drawing Sheets

FIG. 5                                    16

| | Level 1 | Level 2 | DC Fast Charging |
|---|---|---|---|
| Connector Type[1] | J1772 connector | J1772 connector | CCS connector<br><br>CHAdeMO connector<br><br>Tesla connector |
| Typical Power Output | 1 kW | 7 kW - 19 kW | 50 - 350 kW |
| Estimated PHEV Charge Time from Empty[2] | 5 - 6 hours | 1 - 2 hours | N/A |
| Estimated BEV Charge Time from Empty[3] | 40 - 50 hours | 4 - 10 hours | 20 minutes - 1 hour[4] |
| Estimated Electric Range per Hour of Charging | 2 - 5 miles | 10 - 20 miles | 180 - 240 miles |
| Typical Locations | Home | Home, Workplace, and Public | Public |

PRIOR ART

CHARGING DEVICE

BACKGROUND

A device can be propelled by an electric motor that utilizes a rechargeable battery as a power source. Charge port provided on the device is connected to a charger or electric device supply equipment furnished in a home, a charging station, or the like to recharge the battery.

Some devices are provided with a single externally mounted charge port. In the case of devices provided with multiple charging options, each charging connection is provided for a different charging design standard. These different standards may be designed in accordance with needs of countries and companies.

Despite improvement of battery charging times to charge electric device batteries and increase in total power consumption in specific device models, there is a demand to improve recharge rates of electric device batteries.

SUMMARY

Therefore, in order to increase charging rate of an electric device battery, a charging device for smaller electric devices with outputs of several hundred kilowatts or larger electric devices with larger outputs is proposed. This charging device includes uniform supply inlets that can be electrically connected in at least one electrical path to increase charging rate of an electric device battery.

An electric device may be charged faster when the electric device can be connected to multiple chargers simultaneously. This is useful for medium or heavy-duty devices with very large battery capacities or multiple battery packs. This also permits use of less expensive chargers that can be combined to achieve power output of more expensive higher power chargers.

Therefore, It is desirable to provide a device for charging electrical devices with more than one charging device supplied with uniform charging standards.

This disclosure is a charging device with supply inlets for recharging a battery of an electrical device. In an embodiment, a charging device comprises supply inlets having contact elements engageable with a power source. Charging control modules are included in the supply inlets. A uniform charging standard comprise each of the charging control modules.

BRIEF DESCRIPTION OF THE DRAWINGS

FIG. 5 is a prior art table summarizing power output, charging time, and locations of chargers for electric devices.

DETAILED DESCRIPTION

The following detailed description is a contemplated mode of carrying out a charging device 10 and process described herein. Although the charging device 10 is explained in relation to an illustrated embodiment, it is understood that many possible modifications and variations can be made without departing from the spirit and scope of the disclosure. Therefore, the charging device 10 may be used to recharge a rechargeable battery 22 of various types having a plurality of energy storage systems, traction battery packs, varied battery chemistries, capacities, conversion methods, electric architecture, enclosures, planar cells, device performance needs, and the like to provide electric needs of a device. There are well know charging levels and methods including, but not limited to direct current (DC) fast charging, alternating current (AC) Level 1 up to 1.92 Kilowatts (KW), AC Level 2 up to 19.2 KW, DC Level 1 up to 48 KW, DC level 2 up to 400 KW and similar adjustable charging levels that would be applicable to the rechargeable battery 22 described herein.

It can be appreciated that implementation of a battery recharging process from a power source can include a device capable of generating and/or supplying electric power and any power source as long as the power source can supply electricity to an electric device supply equipment. For example, power transmission and distribution facilities, or one or more power generators can be considered as power sources for charging the electric devices.

The charging device 10 may be used on various types of an electrical device 26 including a battery electric device (BEV), a plug-in device, an ultra low-emission device, a range extended device, a hybrid device and a charge connection device provided in an accessible area, including front area, back area, side area, an area recommended by or as desired by a device manufacturer and the like.

Figure 1:
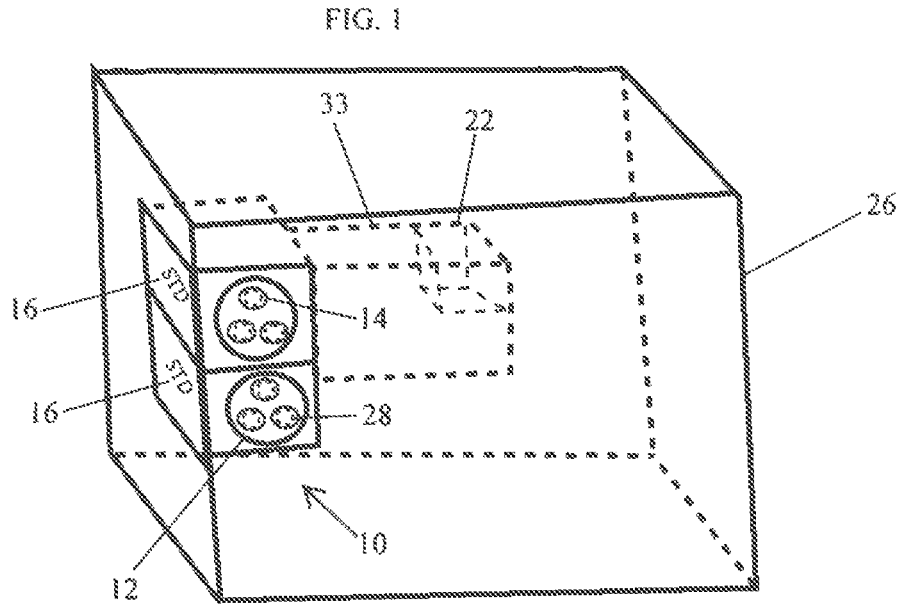
FIG. 1 is a perspective view of a charging device described herein.

Referring now to FIG. 1, the charging device 10 according to one embodiment of the present disclosure includes supply inlets 12 having charging control modules 14. A uniform charging standard 16 comprises each of the charging control modules 14. The charging device 10 is operable in a charging cycle 18 of a rechargeable battery 22. The charging device 10 can be used as a power source 24 of an electrical device 26. The supply inlets 12 have contact elements 28 for contacting the power source 24 and for operating in the charging cycle 18 of the rechargeable battery 22. The supply inlets 12 are capable of coupling with and receiving power from a charger 32 in at least one electrical supply path 33. The charger 32 includes uniform charging standards for dispensing from the power source 24. The charging cycle 18 is activated by attaching the charger 32 to the supply inlets 12 of the charging device 10. The charging control modules 14 provide an integrated charging mode 34 based on control signals 36 that are executable by the charging device 10 for controlling the integrated charging mode 34 of the rechargeable battery 22.

The charging device 10 includes supply inlets 12 that can be provided, in one embodiment, side-by-side to provide a unitary charging experience, one on top of another, or positioned separately to provide a spaced charging environment.

Figure 2:
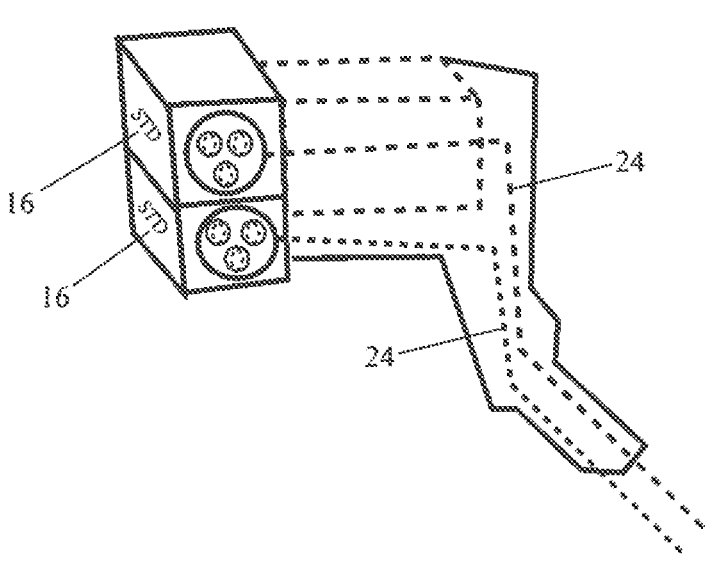
FIG. 2 is a perspective view of charger described herein.
Figure 3:
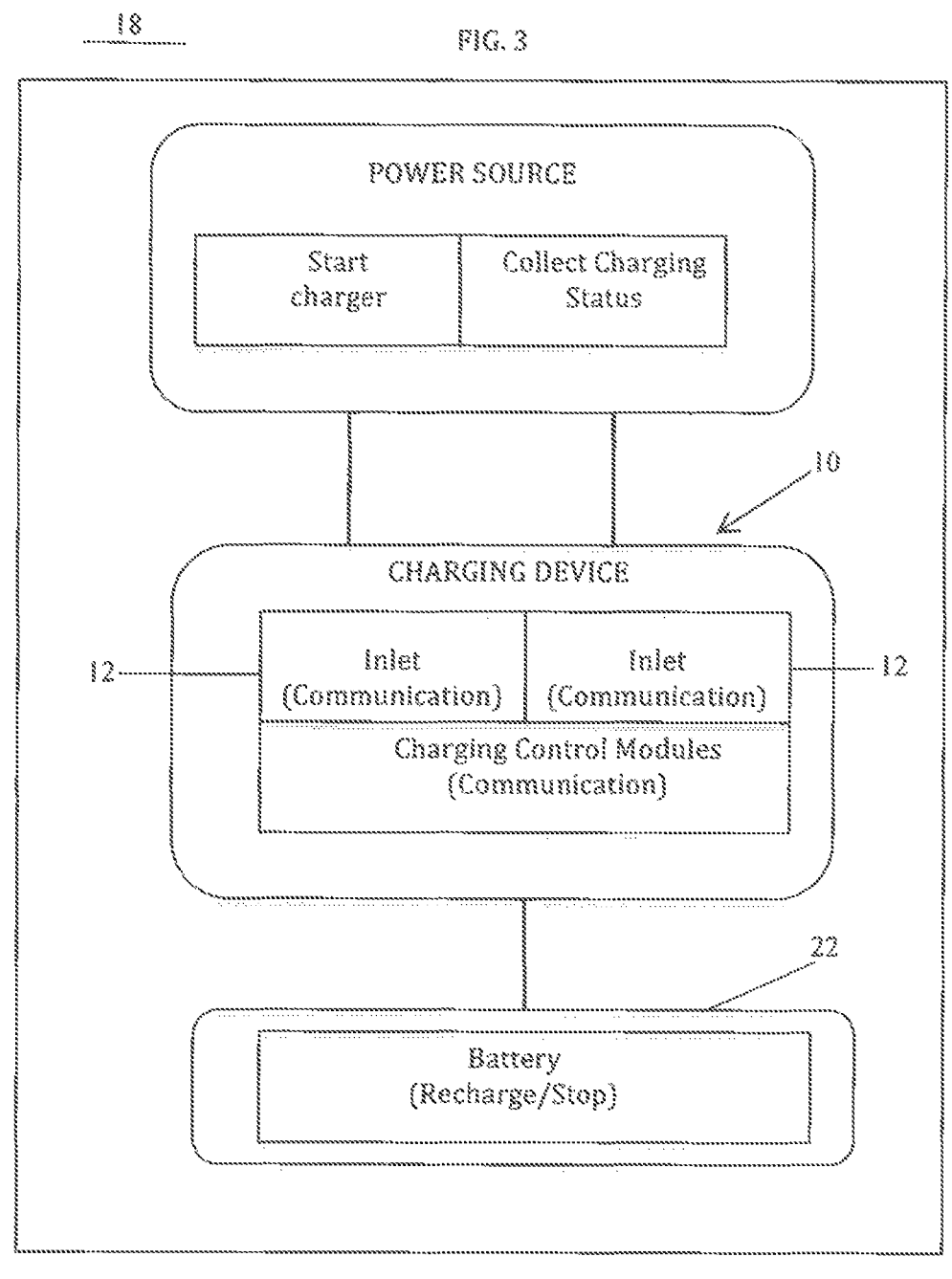
FIG. 3 is a block diagram of a charging system described herein.
Figure 4:
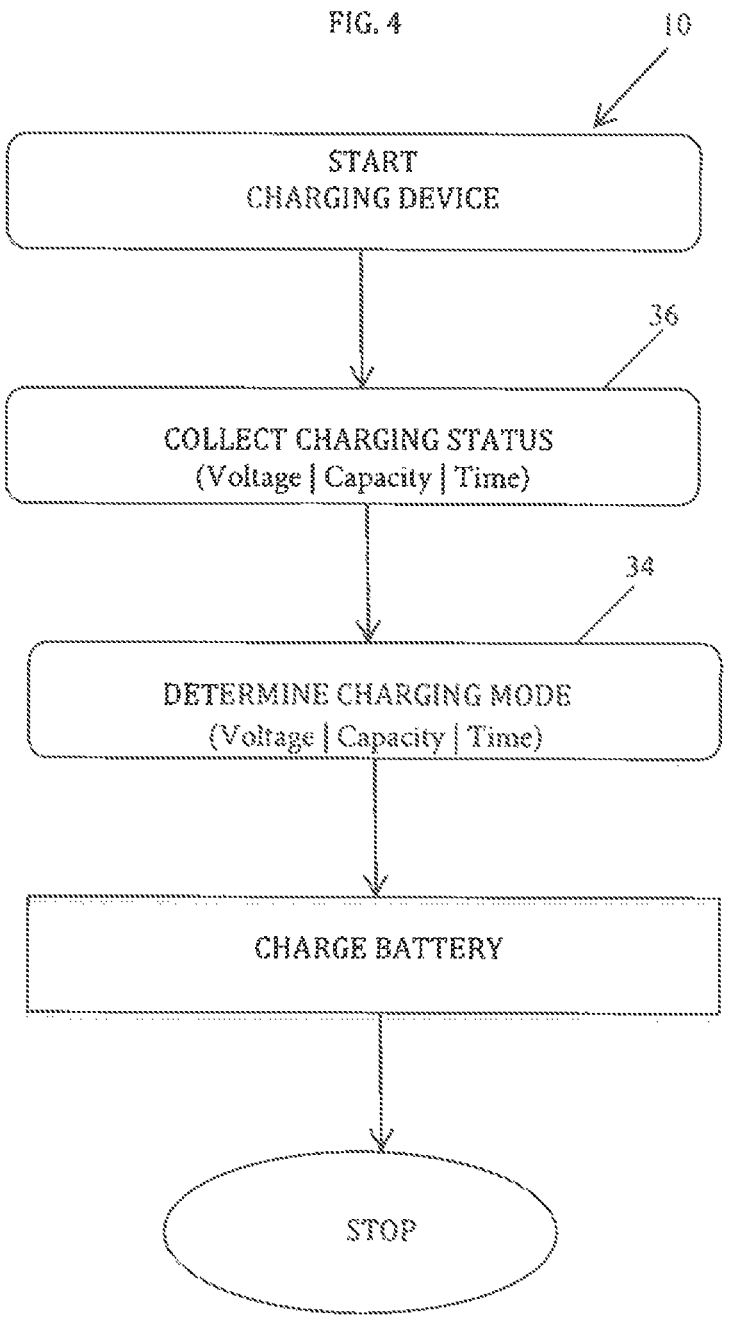
FIG. 4 is a flow chart of a method of recharging a rechargeable battery according to an embodiment described herein.

The supply inlets 12, as shown in FIG. 2, include charging control modules 14 each having a uniform charging standard further governed by a charging cycle 18. The charging cycle 18 may be a pre-selected charging condition based on the control signals 36 received from the charging control modules 14. That is, for example, the supply inlets 12 may have charging control modules 14 that can be contact points or contact plates receiving direct DC level 1 power, receiving DC level 2 power, providing the control status of the charging device 10, providing a connection status of the charging device 10, controlling battery charge, and communicating to monitor the charging cycle 18. Charging control modules 14 can be configured to communicate and to provide additional control signals 36 to device command stations, charge stations and the like to address charging needs, including charge types, charge current information, and charging times, of an electrical device 26.

Charging design standards for an electrical device 26 are broadly classified into a charging system, a charging interface, or a communication protocol which may include direct current charging, alternating current charging, a combined charging system, or a charging capacity of a specified limit (for example 50 KW). Further, charging modes might comply with combined charging system (CCS) standards, national charging standards, standards from different countries, and government recommended practices to maintain safety while using and charging electrical devices 26.

The charging device 10 may be connected to the charger 32 which can be a coupler, or the like of an external system and receive battery power from the electric device supply equipment provided at various charging locations including a home, a charging station and the like. The charging device 10 may be coupled, either wired or wireless, to the charger 32. Further, the supply inlets 12 may receive electric device supply equipment information, for example, wiring data, a charging design standard, voltage information, charging time information, and the like from the connected external electric device supply equipment.

What is claimed is:

1. A charging device comprising:
supply inlets having contact elements engageable with a power source;
charging control modules included in the supply inlets; and
a uniform charging standard comprising each of the charging control modules.

2. The charging device of claim 1, wherein the supply inlets include a first and second supply inlet and said first and second supply inlets have a same connector type.

3. The charging device of claim 2, wherein said connector type is selected from the group consisting of a J1772 connector, a CCS connector, a CHAdeMO connector and a Tesla connector.

4. The charging device of claim 3, wherein said first and second supply inlets are located to connect to a corresponding first and second charger for simultaneous charging, thereby increasing a charging rate, as compared to non-simultaneous charging.

5. The charging device of claim 4, wherein said first and second supply inlets are in a side-by-side configuration each located on a plane defined by an exterior surface of an electrical device comprising the charging device.

6. The charging device of claim 5, wherein said first and second supply inlets are spaced apart in the side-by-side configuration.

7. The charging device of claim 6, wherein said first and second supply inlets are each configured to receive information including wiring data, a charging design standard, voltage information, and charging time information from a connected external electrical device supply equipment.

8. The charging device of claim 2, wherein the charging control modules include a first and second charging module each included in a respective one of the first and second supply inlets.

9. The charging device of claim 8, wherein each said charging control module is configured to communicate control signals to at least one external charging station connected to the supply inlets; and
wherein the control signals have information about a charge type, a charge current and a charge time associated with charging a rechargeable battery in an electrical device having the charging device.

10. The charging device of claim 9, wherein the uniform charging standard of the electrical device includes at least one of: a charging system, a charging interface, and a communication protocol.

11. An electrical device comprising:
a rechargeable battery; and
a charging device comprising:
supply inlets having contact elements engageable with a power source;
charging control modules included in the supply inlets; and
a uniform charging standard comprising each of the charging control modules.

12. The electrical device of claim 11, wherein the supply inlets include a first and second supply inlet and said first and second supply inlets have a same connector type.

13. The electrical device of claim 12, wherein said connector type is selected from the group consisting of a J1772 connector, a CCS connector, a CHAdeMO connector and a Tesla connector.

14. The electrical device of claim 13, wherein said first and second supply inlets are located to connect to a corresponding first and second charger for simultaneous charging, thereby increasing a charging rate, as compared to non-simultaneous charging.

15. The electrical device of claim 14, wherein said first and second supply inlets are in a side-by-side configuration each located on a plane defined by an exterior surface of the electrical device comprising the charging device.

16. The electrical device of claim 15, wherein said first and second supply inlets are spaced apart in the side-by-side configuration.

17. The electrical device of claim 16, wherein said first and second supply inlets are each configured to receive information including wiring data, a charging design standard, voltage information, and charging time information from a connected external electrical device supply equipment.

18. The electrical device of claim 12, wherein the charging control modules include a first and second charging module each included in a respective one of the first and second supply inlets.

19. The electrical device of claim 18, wherein each said charging control module is configured to communicate control signals to at least one external charging station connected to the supply inlets; and
wherein the control signals have information about a charge type, a charge current and a charge time associated with charging the rechargeable battery.

20. The electrical device of claim 19, wherein the uniform charging standard of the electrical device includes at least one of: a charging system, a charging interface, and a communication protocol.

\* \* \* \* \*